US011110765B2

(12) United States Patent
Peck et al.

(10) Patent No.: US 11,110,765 B2
(45) Date of Patent: Sep. 7, 2021

(54) SUSPENSION SPRING SADDLE

(71) Applicant: Mahindra N.A. Tech Center, Auburn Hills, MI (US)

(72) Inventors: David E. Peck, Rochester Hills, MI (US); Olivier A-M Thomas, Birmingham, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 84 days.

(21) Appl. No.: 16/427,932

(22) Filed: May 31, 2019

(65) Prior Publication Data
US 2020/0376910 A1 Dec. 3, 2020

(51) Int. Cl.
*B60G 11/113* (2006.01)
*F16F 1/38* (2006.01)
*F16F 1/26* (2006.01)
*F16F 1/368* (2006.01)
*B60G 11/04* (2006.01)
(Continued)

(52) U.S. Cl.
CPC ............ *B60G 11/113* (2013.01); *B60G 11/04* (2013.01); *B60G 11/12* (2013.01); *B60G 2202/11* (2013.01); *B60G 2204/121* (2013.01); *B60G 2204/4306* (2013.01); *F16F 1/26* (2013.01);
(Continued)

(58) Field of Classification Search
CPC . B60G 11/113; B60G 11/12; B60G 2204/121; F16F 1/26; F16F 1/3683; F16F 1/3842
See application file for complete search history.

(56) References Cited

U.S. PATENT DOCUMENTS 788,661 A   5/1905 Lindsay
1,097,386 A 5/1914 Boreham
(Continued)

FOREIGN PATENT DOCUMENTS

EP  0810109 B1    5/2001
JP  2002-154312 A 5/2002

OTHER PUBLICATIONS

International Search Report from corresponding PCT/US2019/020949, dated Sep. 15, 2020.
(Continued)

*Primary Examiner* — Paul N Dickson
*Assistant Examiner* — Daniel M. Keck
(74) *Attorney, Agent, or Firm* — Harness, Dickey & Pierce, P.L.C.

(57) ABSTRACT

A suspension interconnection assembly comprises first and second saddle brackets and a fastener. Each saddle bracket comprises a base, a pair of arms spaced apart and have the base disposed therebetween, and a pair of shoulders. Each shoulder is disposed between the base and a respective arm. Each shoulder has a first beveled surface. The pair of shoulders cooperates with the base and the pair of arms to at least partially define a U-shaped pocket. The U-shaped pockets of each saddle bracket are sized to partially receive an axle housing. The fastener interconnects the saddle brackets to couple the saddle brackets and a spring to the axle housing. The beveled surfaces of each saddle bracket are adapted to operatively engage the peripheral wall. The pairs of arms of each saddle bracket are adapted to operatively engage one another after the beveled surfaces operatively engage the peripheral wall.

20 Claims, 9 Drawing Sheets

(51) Int. Cl.
B60G 11/12 (2006.01)
B60G 9/00 (2006.01)

(52) U.S. Cl.
CPC ............ *F16F 1/3683* (2013.01); *F16F 1/3842* (2013.01); *F16F 1/3849* (2013.01)

(56) References Cited

U.S. PATENT DOCUMENTS

| | | | |
|---|---|---|---|
| 1,189,590 | A | 7/1916 | Loomis |
| 1,292,611 | A | 1/1919 | Jones |
| 1,377,430 | A | 5/1921 | Pett |
| 1,748,528 | A | 2/1930 | Stott |
| 3,437,333 | A | 4/1969 | Koch |
| 3,913,937 | A * | 10/1975 | Longworth ............ B60G 7/04 280/680 |
| 4,371,190 | A | 2/1983 | Vandenberg |
| 5,328,159 | A | 7/1994 | Kaufman et al. |
| 6,406,008 | B1 | 6/2002 | Dudding et al. |
| 6,659,481 | B2 | 12/2003 | Auerbach et al. |
| 6,857,645 | B2 | 2/2005 | Melton et al. |
| 7,175,190 | B2 | 2/2007 | Reineck |
| 8,459,676 | B2 | 6/2013 | Heimann et al. |
| 8,540,262 | B2 | 9/2013 | Reiter et al. |
| 8,540,263 | B2 | 9/2013 | Pizzeta |
| 2005/0023788 | A1 | 2/2005 | Svartz et al. |
| 2005/0253351 | A1 * | 11/2005 | Pan ................... B60G 9/003 280/124.116 |
| 2014/0117176 | A1 * | 5/2014 | Pierce .................. B60T 17/088 248/205.1 |
| 2019/0047344 | A1 | 2/2019 | Kim et al. |
| 2019/0170567 | A1 * | 6/2019 | Pearson ............ B60G 17/0182 |

OTHER PUBLICATIONS

Written Opinion from corresponding PCT/US2019/020949, dated Sep. 15, 2020.

* cited by examiner

SUSPENSION SPRING SADDLE

FIELD

The present disclosure relates in general to vehicle axle assemblies and the interconnection between the vehicle axle assembly and a vehicle suspension, and more particularly to suspension interconnection assemblies and methods of assembling suspension interconnection assemblies.

BACKGROUND

This section provides background information related to the present disclosure which is not necessarily prior art.

Many vehicles are equipped with structures identified as axle assemblies for supporting rotatable wheels. Some axle assemblies, such as drive axle assemblies, include a number of rotatable components operable to transmit power from an engine of the vehicle to the wheels. The rotatable components of the axle assembly are typically enclosed in an axle housing. The axle housing may include a central enlarged or banjo portion for receipt of a rotatable ring and gear assembly as well as a differential mechanism. The axle housing typically includes a pair of outwardly extending tubular portions integrally formed with the central portion. Previously known examples of axle housings include hollow cylindrical steel tubes that are fixed to the central portion by welding or other mechanical means. Other axle housings may be formed by interconnecting two "C" shaped middle members to one another by a transversely extending set of welds.

The axle housing typically also includes a pair of mounting flanges fixed to outboard ends of the outwardly extending tubes to provide mounting provisions for components such as brakes. It is also common for a seat comprised of one or more individual components to be fixed to the axle housing tubes for interconnecting the axle assembly and a vehicle body by a suspension system that includes springs. Springs have been useful to interconnect a vehicle frame with an axle housing to isolate the vehicle body/frame from loads imparted to the wheels as the vehicle travels.

While previously implemented spring seats may have satisfactorily functioned in the past, strides may be made to improve the robustness of the axle assembly and suspension by minimizing stress concentrations imparted by the design and manufacturing processes such as welding. Accordingly, a need exists for an improved spring seat and axle assembly manufacturing process for providing a robust axle assembly exhibiting increased fatigue life.

SUMMARY

This section provides a general summary of the disclosure, and is not a comprehensive disclosure of its full scope or all of its features.

The present disclosure provides a suspension interconnection assembly for a vehicle including a spring and an axle housing having a peripheral wall. The suspension interconnection assembly comprises a first saddle bracket, a second saddle bracket, and a fastener. The first saddle bracket comprises a first base, a pair of first arms, and a pair of first shoulders. The first arms are spaced apart and have the first base disposed therebetween. Each first shoulder is disposed between the first base and a respective first arm. Each first shoulder has a first beveled surface. The pair of first shoulders cooperates with the first base and the pair of first arms to at least partially define a first U-shaped pocket. The second saddle bracket comprises a second base, a pair of second arms, and a pair of second shoulders. The second arms are spaced apart and have the second base disposed therebetween. Each second shoulder is disposed between the second base and a respective second arm. Each second shoulder has a second beveled surface. The pair of second shoulders cooperates with the second base and the pair of second arms to at least partially define a second U-shaped pocket. The first U-shaped pocket and the second U-shaped pocket are sized to partially receive the axle housing. The fastener interconnects the first saddle bracket and the second saddle bracket to couple the first saddle bracket, the second saddle bracket, and the spring to the axle housing. The first beveled surfaces are adapted to operatively engage the peripheral wall. The second beveled surfaces are adapted to operatively engage the peripheral wall. The pair of first arms is adapted to operatively engage the pair of second arms after the first beveled surfaces and second beveled surfaces operatively engage the peripheral wall.

In some configurations, in a first loaded configuration, the pair of first arms is spaced apart from the pair of second arms to define a gap between distal ends of the first arms and the second arms along a first axis. The first axis is substantially perpendicular to the longitudinal axis. The first beveled surface and the second beveled surface operatively engage the peripheral wall to generate a first compressive stress in the peripheral wall along the first axis and a second compressive stress in the peripheral wall along a second axis. The second axis is substantially perpendicular to the first axis and the longitudinal axis. In a second loaded configuration, the pair of first arms operatively engages the pair of second arms to generate a third compressive stress in the pair of first arms and the pair of second arms along the first axis.

In some configurations, the fastener engages the first saddle bracket and the second saddle bracket at a first longitudinal region of the suspension interconnection assembly. The first saddle bracket further includes a pair of first protrusions. The first protrusions are disposed at a third longitudinal region of the suspension interconnection assembly. Each first protrusion extends from a respective first beveled surface. Each first protrusion is adapted to operatively engage the peripheral wall. The second saddle bracket further includes a pair of second protrusions disposed at the third longitudinal region. Each second protrusion extends from a respective second beveled surface. Each second protrusion is adapted to operatively engage the peripheral wall.

In some configurations, the fastener comprises a first fastener and a second fastener. The first longitudinal region comprises a pair of first longitudinal regions. The third longitudinal region is disposed between the pair of first longitudinal regions.

In some configurations, the suspension interconnection assembly further comprises a plate operable to capture the spring between the second saddle bracket and the plate. The fastener engages the plate to couple the plate and the spring to the axle housing.

In some configurations, the fastener comprises a U-bolt. The U-bolt extends around at least a portion of a first outer surface of the first saddle bracket and at least a portion of a second outer surface of the second saddle bracket.

In some configurations, the first outer surface includes a first channel. The second outer surface includes a second channel. The U-bolt is at least partially received in the first channel and the second channel.

In some configurations, the first saddle bracket further comprises a pair of third arms. The pair of third arms is longitudinally spaced apart from the pair of first arms. The second saddle bracket further comprises a fourth pair of arms. The fourth pair of arms is longitudinally spaced apart from the second pair of arms.

In some configurations, the axle housing has a substantially rectangular cross section in a direction substantially perpendicular to the longitudinal axis.

In some configurations, the first base includes a receptacle. The axle housing includes a pin extending from an outer surface of the axle housing. The pin is received by the receptacle.

The present disclosure also provides a method of assembling a suspension interconnection assembly for a vehicle. The method includes disposing a first saddle bracket around a first portion of a peripheral wall of an axle housing having a longitudinal axis. The first saddle bracket comprises a first base, a pair of first arms, and a pair of first shoulders. The first arms are spaced apart and have the first base disposed therebetween. Each first shoulder is disposed between the first base and a respective first arm. Each first shoulder has a first beveled surface. The pair of first shoulders cooperates with the first base and the pair of first arms to at least partially define a first U-shaped pocket. The axle housing is at least partially received in the first U-shaped pocket. The method further includes disposing a second saddle bracket around a second portion of the peripheral wall. The second saddle bracket comprises a second base, a pair of second arms, and a pair of second shoulders. The second arms are spaced apart and have the second base disposed therebetween. Each second shoulder is disposed between the second base and a respective second arm. Each second shoulder has a second beveled surface. The pair of second shoulders cooperates with the second base and the pair of second arms to at least partially define a second U-shaped pocket. The axle housing is at least partially received in the second U-shaped pocket. The pair of first arms is spaced apart from the pair of second arms to define a gap along a first axis substantially parallel to the longitudinal axis. The method further includes operatively engaging the first beveled surfaces and the second beveled surfaces with the peripheral wall to generate a first compressive stress in the peripheral wall along the first axis and a second compressive stress in the peripheral wall along a second axis substantially perpendicular to the first axis and the longitudinal axis. The method further includes operatively engaging the pair of first arms with the pair of second arms to generate a third compressive stress in the pair of first arms and the pair of second arms along the first axis to limit a magnitude of the first compressive stress.

In some configurations, the method further comprises coupling the first saddle bracket and the second saddle bracket to the axle housing by engaging a fastener with the first saddle bracket and the second saddle bracket.

In some configurations, operatively engaging the first beveled surfaces and the second beveled surfaces with the peripheral wall comprises applying a first load to the first saddle bracket and the second saddle bracket parallel to the first axis. Operatively engaging the pair of first arms with the pair of second arms comprises applying a second load to the first saddle bracket and the second saddle bracket parallel to the first axis.

In some configurations, applying the first load comprises tightening the fastener. Applying the second load comprises tightening the fastener.

In some configurations, the fastener is configured to loosen such that a third load is applied to the first saddle bracket and the second saddle bracket along the first axis. The third load is greater than or equal to the first load. The third load is less than or equal to the second load.

In some configurations, the method further comprises, prior to coupling, disposing a spring between the second saddle bracket and a plate. The coupling further includes engaging the fastener with the plate.

In some configurations, the fastener comprises a U-bolt. The coupling includes disposing the U-bolt at least partially in a first channel of a first outer surface of the first saddle bracket and a second channel of a second outer surface of the second saddle bracket.

In some configurations, engaging the fastener comprises engaging the fastener with the first saddle bracket and the second saddle bracket in a first longitudinal region of the suspension interconnection assembly.

In some configurations, the method further comprises operatively engaging a pair of first protrusions and a pair of second protrusions with the peripheral wall in a third longitudinal region of the suspension interconnection assembly. The pair of first protrusions extends from respective first beveled surfaces. The pair of second protrusions extends from respective second beveled surfaces.

In some configurations, the method further comprises adjusting a dimension of the gap prior to operatively engaging the first beveled surfaces and the second beveled surfaces with the peripheral wall. The adjusting includes at least one of (i) reducing a dimension of the gap by disposing a pair of shims between the first pair of arms and the second pair of arms and (ii) increasing a dimension of the gap by machining at least one surface of the pair of first arms and the pair of second arms.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
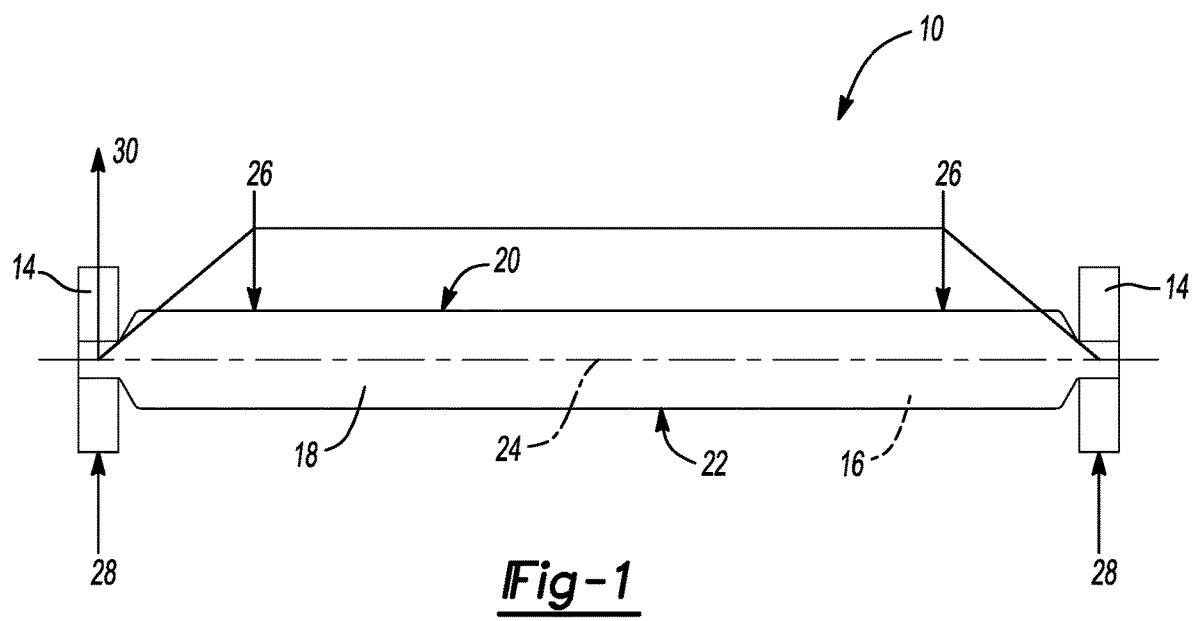
FIG. 1 is a free body and pending moment diagram of a representative axle.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a free body and bending moment diagram of a representative axle assembly 10 of a vehicle in accordance with the subject disclosure is provided. The axle assembly 10 includes an axle (not shown) operatively connected to wheels 14. The axle is at least partially disposed within an interior region 16 of an axle housing 18. The axle housing 18 includes a first or upper portion 20 and a second or lower portion 22. The upper portion 20 and the lower portion 22 are separated by a neutral plane 24. In some embodiments, the neutral plane 24 may extend along a central longitudinal axis of the axle housing 18. However, in various other embodiments, the neutral plane 24 may be offset from the central longitudinal axis.

A mass of a body of the vehicle applies a first load 26 on the upper portion 20 of the axle housing 18. The wheels 14 impart reaction loads or second loads 28 to the axle housing 18. A static loading configuration applies a bending moment 30 in the axle housing 18. The bending moment 30 induces compressive stresses in the upper portion 20 of the axle housing 18 and tensile stresses in the lower portion 22 of the axle housing 18.

With reference to FIGS. 2-7, an axle assembly 38 including two suspension interconnection assemblies 40 in accordance with the subject disclosure is provided. The axle assembly 38 may be disposed in an orthogonal coordinate system including a first axis 42, a second axis 44, and a third axis 46. The axle assembly 38 may include an axle housing 52 adapted to extend laterally across a vehicle. The axle housing 52 may include a central portion 54 and two elongated side portions 56 having outboard ends. Each of the outboard ends of the axle housing 52 may include a mounting flange 60 for attaching components, such as brakes.

Each of the suspension interconnection assemblies 40 may include a portion of the axle housing 52, a spring 62, a first or upper saddle bracket 64, a second or lower saddle bracket 66, two fasteners 68, and a plate 70. In various aspects, the first and second saddle brackets 64, 66 may be collectively referred to as the "saddle assembly."

As will be described in greater detail with reference to a method of assembling the suspension interconnection assembly 40 (see FIG. 9-14), the saddle assembly is configured to apply predetermined compressive loads to the axle housing 52 along the first and second axes 42, 44. Prior to fully assembling the suspension interconnection assembly 40, the first and second saddle brackets 64, 66 are spaced apart to define a pre-clamped gap (see pre-clamped gap 310 of FIG. 11). In a first loaded configuration, the first and second saddle brackets 64, 66 remain spaced apart while being clamped together along the first axis 42 (FIG. 10). The first and second saddle brackets 64, 66 are adapted to operatively engage the axle housing 52 to generate compressive stresses along the first and second axes 42, 44. The compressive stresses are limited by a dimension of the pre-clamped gap. In a second loaded configuration, the gap is closed such that the first and second saddle brackets 64, 66 operatively engage one another. Additional clamping along the first axis generates compressive stresses in the first and second saddle brackets 64, 66 parallel to the first axis 42, thereby minimizing additional loading in the axle housing 52. Accordingly, the first and second saddle brackets 64, 66 may be over-clamped to account for subsequent loosening without crushing the axle housing 52.

Figure 2:
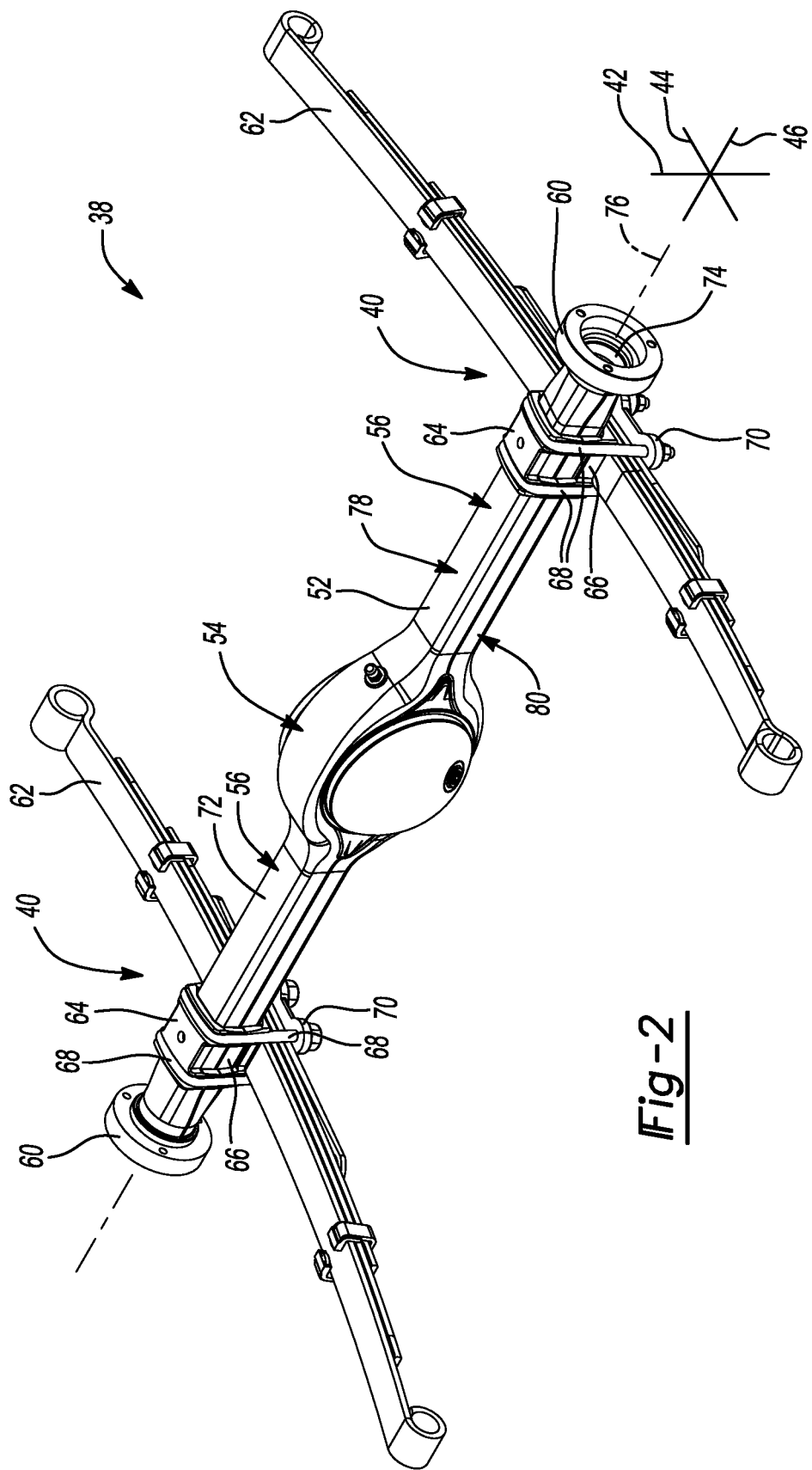
FIG. 2 is a perspective view of a suspension interconnection assembly constructed in accordance with the subject disclosure, the suspension interconnection assembly including a spring saddle assembly, a spring, and an axle housing.
Figure 3:
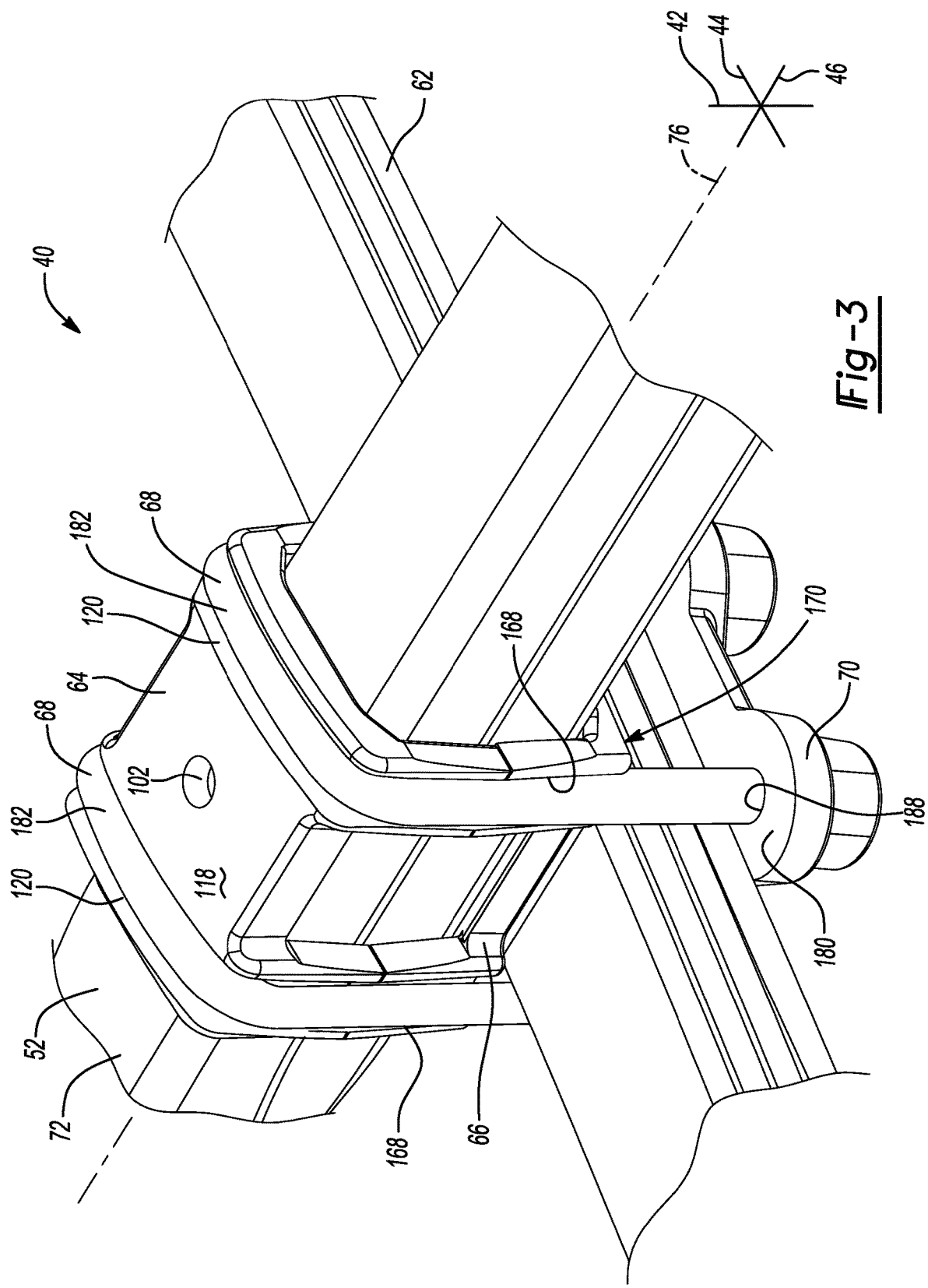
FIG. 3 is a partial perspective view of the suspension interconnection assembly of FIG. 2.
Figure 4:
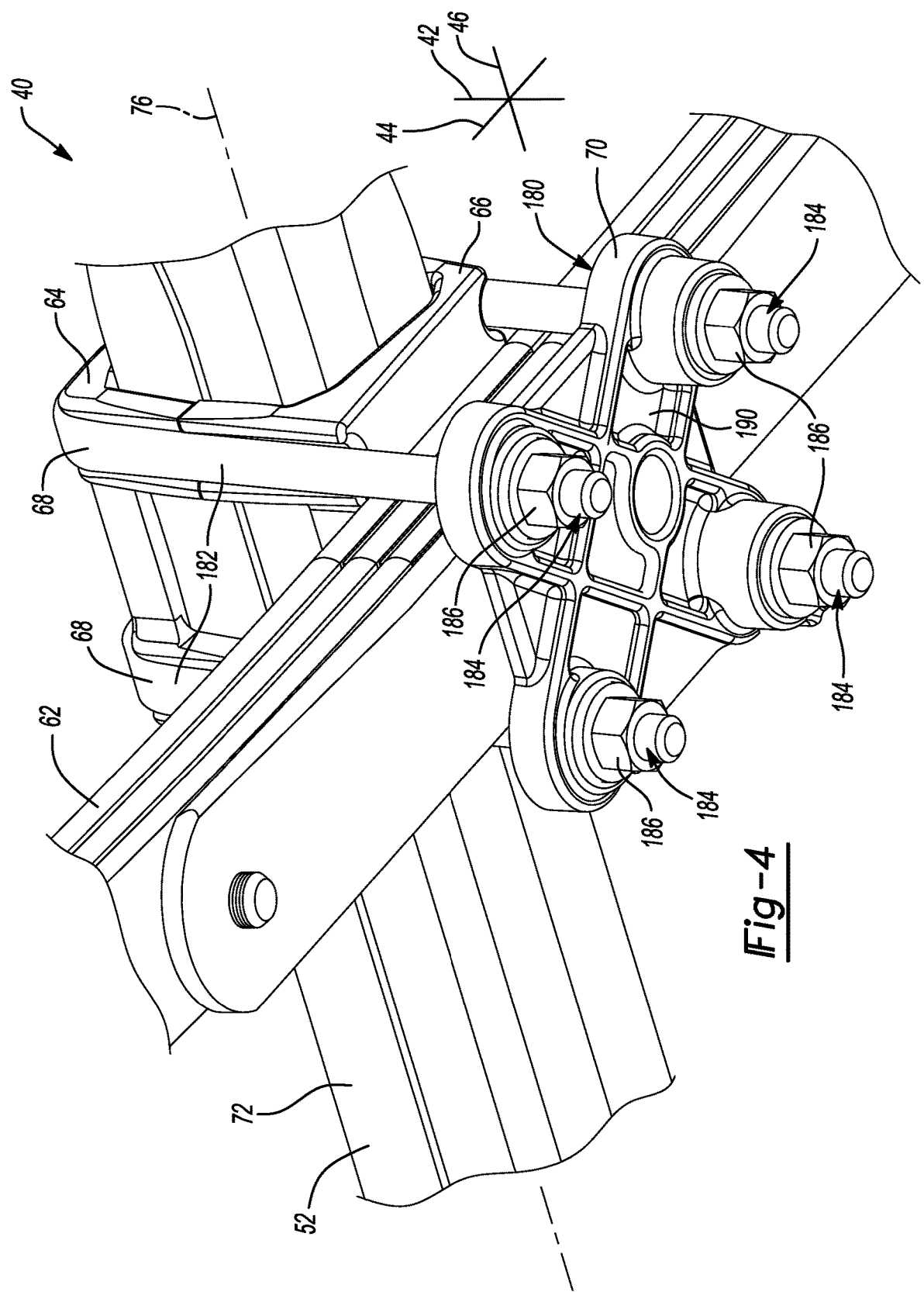
FIG. 4 is another partial perspective view of the suspension interconnection assembly of FIG. 2.
Figure 5:
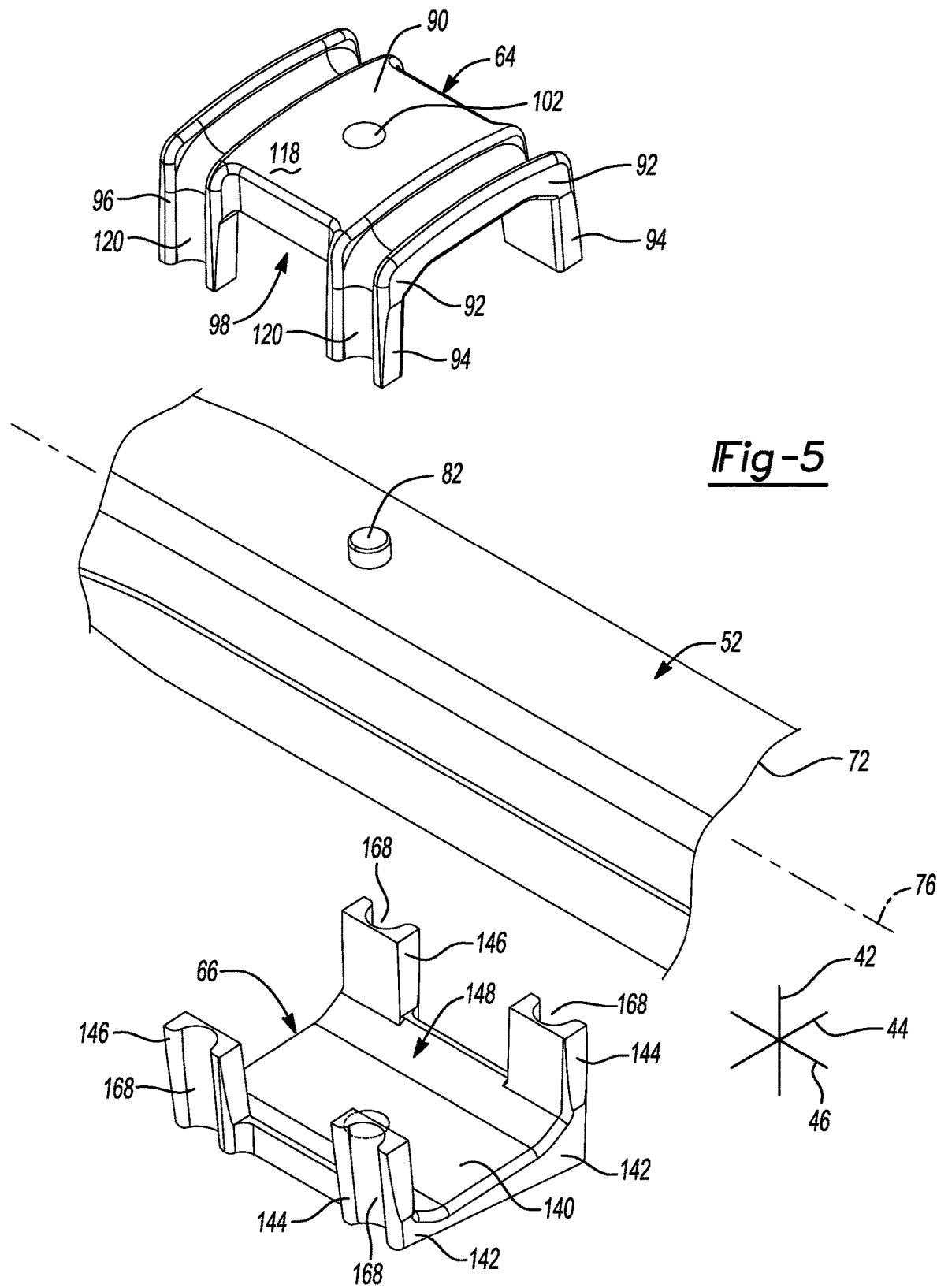
FIG. 5 is a partial exploded view of the suspension interconnection assembly of FIG. 2 showing upper and lower brackets of the spring saddle assembly and the axle housing.

The axle housing 52 includes a peripheral wall 72 and an interior region 74 (FIG. 2). The interior region 74 may be hollow so that it can receive an axle (not shown). The axle housing 52 may extend along a longitudinal axis 76. The longitudinal axis 76 may be substantially parallel to the third axis 46. In the embodiment shown, the axle housing 52 has a substantially rectangular cross section substantially parallel to the longitudinal axis 76. In some embodiments, the rectangular cross section may be substantially square. In other embodiments, an axle housing may have other cross-sectional shapes, such as elliptical, circular, or stadium. As described above, the axle housing 52 includes a first or upper portion 78 that is subject to compressive stresses in a static loading condition, and a second or lower portion 80 that is subject to tensile stresses in the static loading condition (FIG. 1). The upper portion 78 may include a pin 82 (FIG. 5) on each elongated side portion 56.

The suspension interconnection assembly 40 may include two springs 62, with each spring 62 being disposed on a respective elongated side portion 56 of the axle housing 52. Each spring 62 may be coupled to the axle housing 52 by the first and second saddle brackets 64, 66, two of the fasteners 68, and one of the plates 70. Each of the springs 62 is clamped between a respective second saddle bracket 66 and plate 70. The first and second saddle brackets 64, 66 cooperate to restrict movement of the spring 62 with respect to the axle housing 52 along the longitudinal axis 76. In certain aspects, the springs 62 may be leaf springs.

Figure 6:
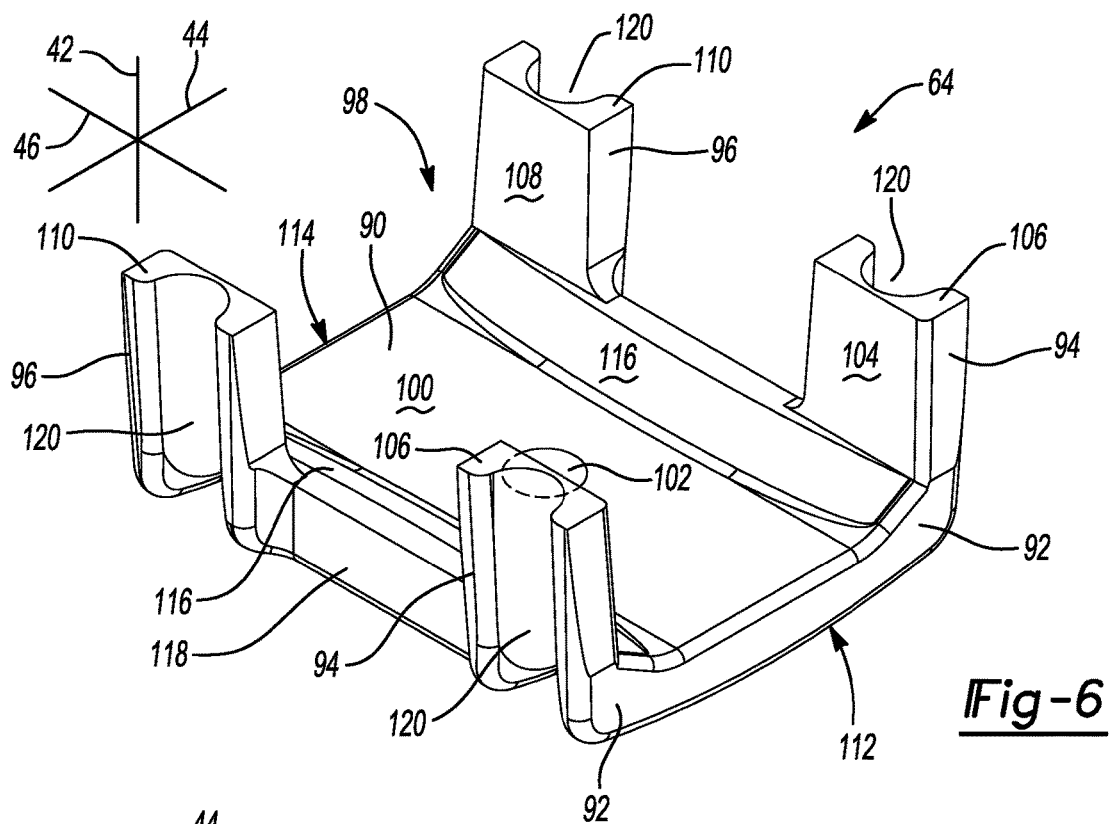
FIG. 6 is a perspective view of the upper saddle bracket of FIG. 4.

With reference to FIG. 6, the first saddle bracket 64 includes a first base 90, a pair of first shoulders 92, a pair of first arms 94, and a pair of second arms 96. The first base 90 is disposed laterally between the first shoulders 92. Each of the first shoulders 92 is disposed between the first base 90 and respective first and second arms 94, 96. The first base 90, the pair of first shoulders 92, the pair of first arms 94, and the pair of second arms 96 cooperate to at least partially define a first U-shaped pocket 98.

The first base 90 may include a first inner surface 100. The first inner surface 100 is in communication with the first U-shaped pocket 98. The first inner surface 100 may be substantially planar. The first inner surface 100 may include a receptacle 102. In the embodiment shown, the receptacle 102 is a through hole. However, in other embodiments, a receptacle may be a depression, for example. The receptacle 102 may be adapted to receive the pin 82 of the axle housing 52 to locate the first saddle bracket 64 on the peripheral wall 72 along the longitudinal axis 76.

The pair of first arms 94 and the pair of second arms 96 project from the first shoulders 92 away from the first base 90. In the embodiment shown, the pair of first arms 94 is longitudinally spaced apart from the pair of second arms 96 along the third axis 46. The pair of first arms 94 may be disposed at a first end 112 of the first saddle bracket 64 and the pair of second arms 96 may be disposed at a second end 114 of the first saddle bracket 64. In other embodiments, pairs of first and second arms may be spaced apart from respective first and second ends of a first saddle bracket. In yet other embodiments, a first saddle bracket may include a single pair of arms. Each arm may extend along at least a portion of a length of the first saddle bracket substantially parallel to the third axis 42, which may be an entire length of the first saddle bracket. In yet other embodiments, a first saddle bracket may include more than two pairs of arms.

With renewed reference to FIG. 6, each of the first arms 94 includes a first arm surface 104 and a first distal surface 106. Each of the second arms 96 includes a second arm surface 108 and a second distal surface 110. The first arm surfaces 104 and the second arm surfaces 108 are in communication with the first U-shaped pocket 98.

Each of the first shoulders 92 includes a first beveled surface 116. The first beveled surfaces 116 extend between the first inner surface 100 and the first and second arm surfaces 104, 108. The first beveled surfaces 116 are in communication with the first U-shaped pocket 98. The first beveled surfaces 116 are adapted to operatively engage the peripheral wall 72 of the axle housing 52.

The first saddle bracket 64 includes a first outer surface 118. The outer surface 118 defines first channels 120. The first channels 120 may be substantially U-shaped. Each first channel 120 extends from a respective first distal surface 106 to a respective second distal surface 110. Thus, each first channel 120 extends across a respective one of the first arms 94, the first shoulders 92, the first base 90, and a respective one of the second arms 96.

Figure 7:
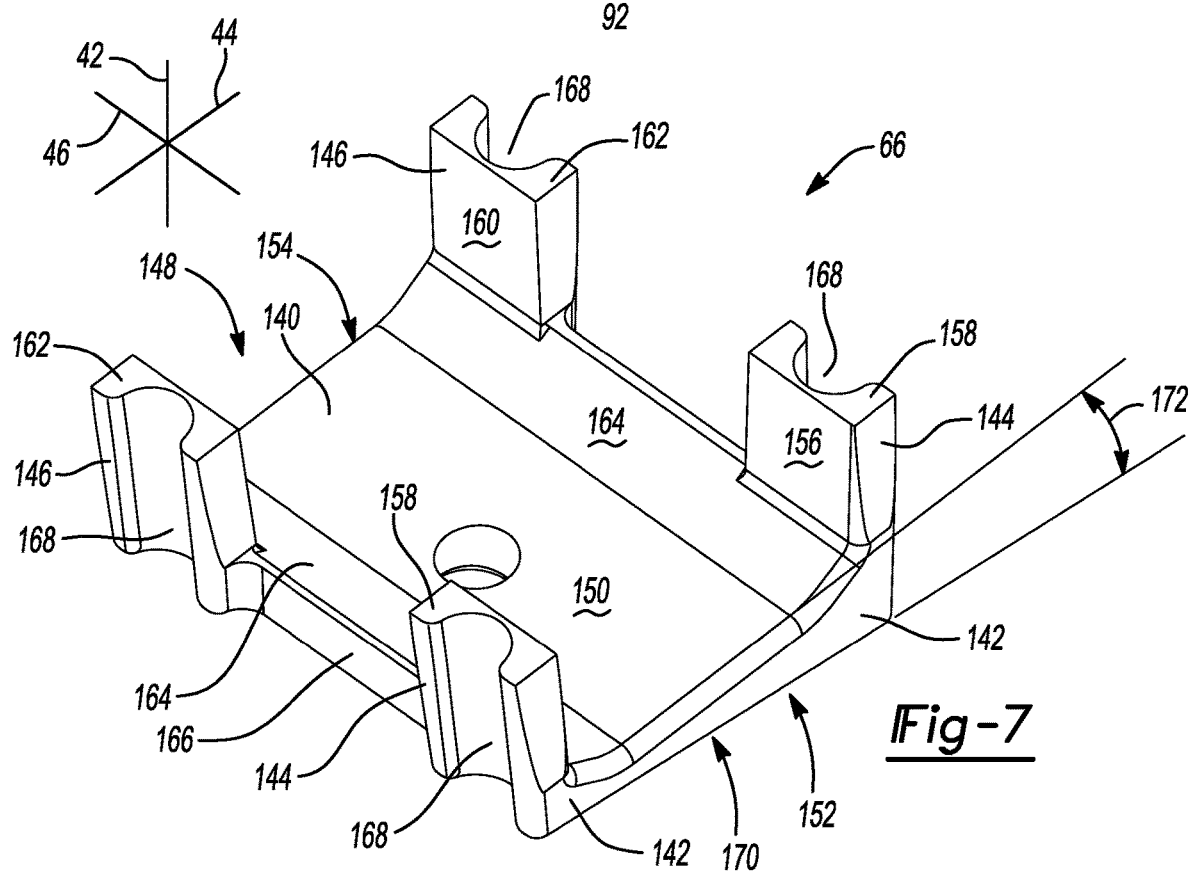
FIG. 7 is a perspective view of the lower saddle bracket of FIG. 4.

Referring to FIG. 7, the second saddle bracket 66 includes a second base 140, a pair or second shoulders 142, a pair of third arms 144, and a pair of fourth arms 146. The second base 140 is disposed laterally between the second shoulders 142. Each of the second shoulders 142 is disposed laterally between the second base 140 and respective third and fourth arms 144, 146. The second base 140, the pair of second shoulders 142, the pair of third arms 144, and the pair of fourth arms 146 cooperate to at least partially define a second U-shaped pocket 148.

The second base 140 may include a second inner surface 150. The second inner surface 150 is in communication with the second U-shaped pocket 148. The second inner surface 150 may be substantially planar.

The pair of third arms 144 and the pair or fourth arms 146 project from the second shoulders 142 away from the second base 140. In the embodiment shown, the pair of third arms 144 is longitudinally spaced apart from the pair of fourth arms 146 along the third axis 46. The pair of third arms 144 may be disposed at a third end 152 of the second saddle bracket 66 and the pair of fourth arms 146 may be disposed at a fourth end 154 of the second saddle bracket 66. In other embodiments, pairs of third and fourth arms may be spaced apart from respective third and fourth ends of a second saddle bracket. In yet other embodiments, a second saddle bracket may include a single pair of arms. Each arm may extend along at least a portion of a length of the second saddle bracket substantially parallel to the third axis 46, which may be an entire length of the second saddle bracket.

In yet other embodiments, a second saddle bracket may include more than two pairs of arms.

With renewed reference to FIG. 7, each of the third arms 144 includes a third arm surface 156 and a third distal surface 158. Each of the fourth arms 146 includes a fourth arm surface 160 and a fourth distal surface 162. The third arm surfaces 156 and the fourth arm surfaces 160 are in communication with the second U-shaped pocket 148.

The pair of third arms 144 is adapted to operatively engage the pair of first arms 94 of the first saddle bracket 64. More particularly, the third distal surfaces 158 are adapted to engage the first distal surfaces 106. The pair of fourth arms 146 is adapted to operatively engage the pair of second arms 96 of the first saddle bracket 64. More particularly, the fourth distal surfaces 162 are adapted to engage the second distal surfaces 110.

Each of the second shoulders 142 includes a second beveled surface 164. The second beveled surfaces 164 extend between the second inner surface 150 and the third and fourth arm surfaces 156, 160. The second beveled surfaces 164 are adapted to operatively engage the peripheral wall 72 of the axle housing 52.

The second saddle bracket 66 includes a second outer surface 166. The second outer surface 166 defines two pairs of second channels 168. In the embodiment shown, the second outer surface 166 includes four second channels 168, each of the second channels 168 extending from a respective third or fourth distal surface 158, 162, across the respective third or fourth arm 144, 146, and at least a portion of a second shoulder 142.

A portion 170 of the second outer surface 166 on the second base 140 may be substantially planar. The portion 170 may form an angle 172 with the second inner surface 150. Thus, when the axle housing 52 is disposed within the second U-shaped pocket 148, a bottom rear edge of the axle housing 52 is tilted upward toward a front of the vehicle. This orientation facilitates proper alignment between the axle housing 52 and a transmission.

Returning to FIGS. 3-4, the peripheral wall 72 of the axle housing 52 is at least partially disposed within the first U-shaped pocket 98 of the first saddle bracket 64 and the second U-shaped pocket 148 of the second saddle bracket 66. Thus, the first and second U-shaped pockets 98, 148 are sized to at least partially receive the axle housing. The pin 82 of the axle housing 52 may be received in the receptacle 102 of the first saddle bracket 64. The spring 62 may be clamped between the second saddle bracket 66 and the plate 70. The spring 62 may therefore be in communication with the portion 170 of the second outer surface 166 of the second saddle bracket 66 and a third inside surface 180 of the plate 70.

Each first channel 120 may be aligned with one of the pairs of second channels 168 to form two U-shaped channels that are continuous over both the first saddle bracket 64 and the second saddle bracket 66. In the embodiment shown, the fasteners 68 comprise U-bolts. Each fastener 68 may include a U-shaped body 182 having threaded distal ends 184 and two nuts 186 engaging the threaded distal ends 184. The embodiment shown includes two of the fasteners 68, each of the fasteners 68 being disposed at an opposite longitudinal end of the saddle assembly. However, in other embodiments, a suspension interconnection assembly may include a single fastener or more than two fasteners.

Each U-shaped body 182 may be at least partially received in one of the first channels 120 and a pair of the second channels 168. The spring 62 may be disposed longitudinally between the U-shaped bodies 182 of the fasteners 68. Each U-shaped body 182 may extend past the spring 62 and through two of the apertures 188 in the plate 70. The nuts 186 may engage the threaded distal ends 184 of the U-shaped body 182 to couple the first saddle bracket 64, the second saddle bracket 66, the axle housing 52, and the spring 62 to one another. The nuts 186 may engage a third outside surface 190 of the plate 70 opposite the third inside surface 180.

In the static condition, stresses in the peripheral wall 72 are typically highest at a longitudinal position adjacent to the fasteners 68. In various aspects, the subject disclosure provides another saddle bracket adapted to distribute the compressive stresses across a larger portion of an axle housing, thereby decreasing a maximum compressive stress in the axle housing. The saddle bracket includes one or more pairs of protrusions extending from beveled surfaces an operatively engaging the axle housing. The protrusions are disposed at different longitudinal regions of a suspension interconnection assembly than the fasteners.

Figure 8:
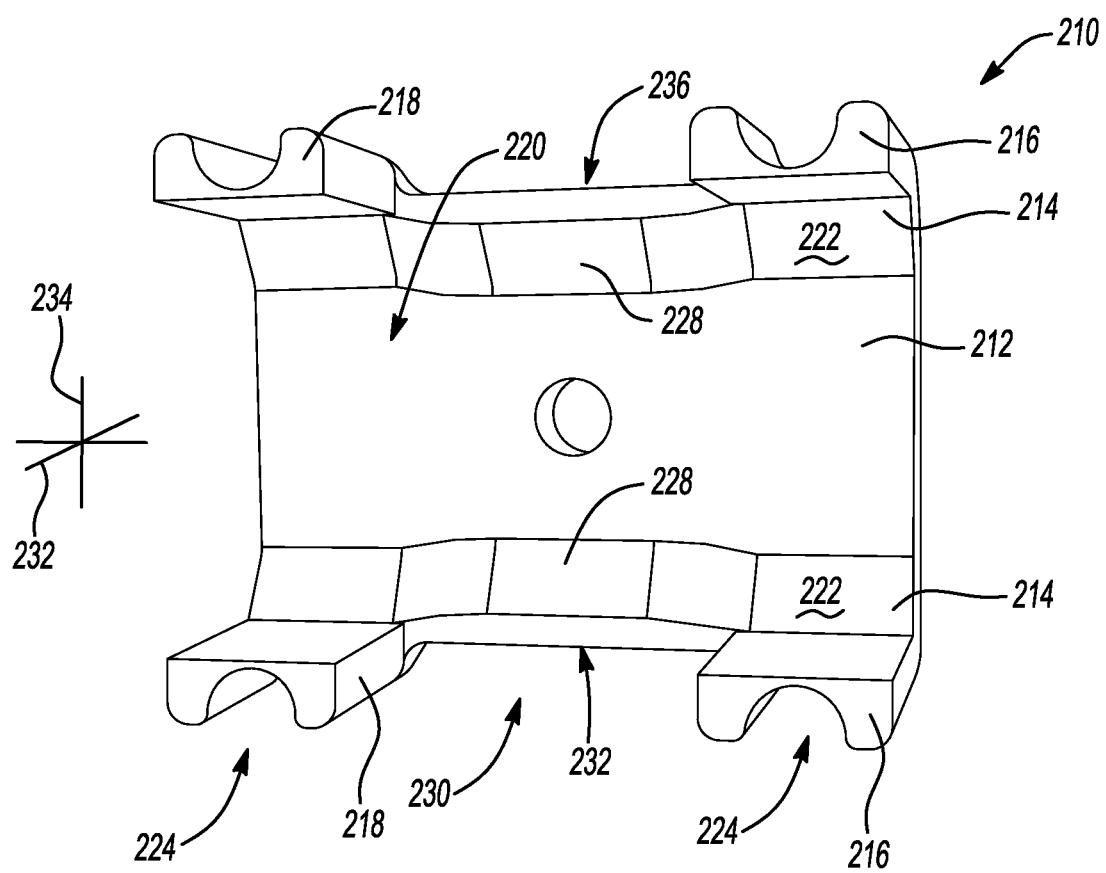
FIG. 8 is a perspective view of another bracket of a spring saddle assembly in accordance with the subject disclosure.

Referring to FIG. 8, another saddle bracket 210 in accordance with the subject disclosure is provided. The saddle bracket 210 may cooperate with another saddle bracket, a spring, a fastener, and a plate to form a suspension interconnection assembly. Except as otherwise described, the saddle bracket 210 may be similar to the first saddle bracket 64 of FIG. 6. The saddle bracket 210 may include a base 212, a pair of shoulders 214, a pair of first arms 216, and a pair of second arms 218, which cooperate to at least partially define a U-shaped pocket 220. Each of the shoulders 214 includes a beveled surface 222 in communication with the U-shaped pocket 220.

The saddle bracket 210 is adapted to engage a pair of fasteners at a first longitudinal region 224. The pair of first arms 216 is disposed at one of the pair of the first longitudinal regions 224. The pair of second arms 218 is disposed at the other of the pair of first longitudinal regions 224. The first longitudinal regions 224 are longitudinally spaced apart from one another. In the embodiment shown, the first longitudinal regions 224 are disposed adjacent to respective ends of the saddle bracket 210.

Each of the shoulders 214 further includes a respective protrusion 228. The protrusions 228 are disposed in a second longitudinal region 230. The second longitudinal region 230 may be distinct from the pair of first longitudinal regions 224. The second longitudinal region 230 may be disposed longitudinally between the first longitudinal regions 224. In some embodiments, the first and second longitudinal regions 224, 230228 may partially overlap.

Each protrusion 228 may extend from a respective beveled surface and protrude into the U-shaped pocket 220. The protrusions 228 are adapted to operatively engage a peripheral wall (e.g., peripheral wall 72 of FIGS. 2-5) to generate compressive stresses in the peripheral wall along first and second axes 232, 234. More particularly, the protrusions 228 are adapted to distribute compressive stress in the peripheral wall. In the embodiment shown, the protrusions 228 are adapted to move a portion of the compressive stress in the peripheral wall away from the pair of first longitudinal regions 224 and to the second longitudinal region 230.

In the embodiment shown, the protrusions 228 extend across an entire longitudinal gap 236 between the pairs of first and second arms 216, 218. In other embodiments, protrusions may extend across a portion of a longitudinal gap between pairs of arms. The protrusions 228 may have a height substantially perpendicular to the beveled surfaces 222. The height may increase to a maximum at a longitudinal center of each protrusion 228. In some embodiments, a saddle bracket may include additional protrusions or pairs of protrusions to move a portion of the compressive stress to an otherwise low-stress area of the peripheral wall of the axle housing.

Figure 9:
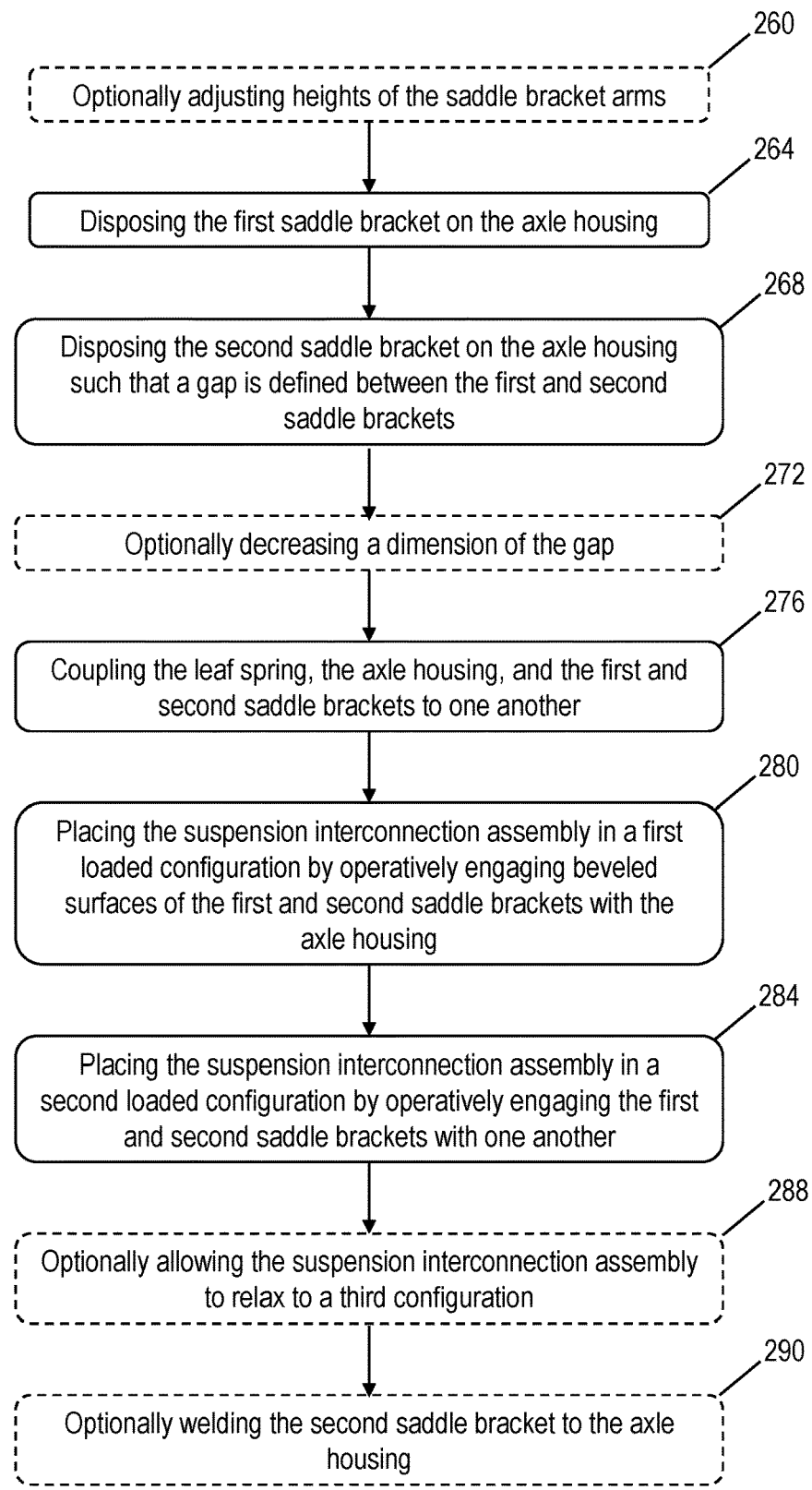
FIG. 9 is flowchart depicting a method of assembling the suspension interconnection assembly of FIG. 1 in accordance with the principles of the subject disclosure.
Figure 10:
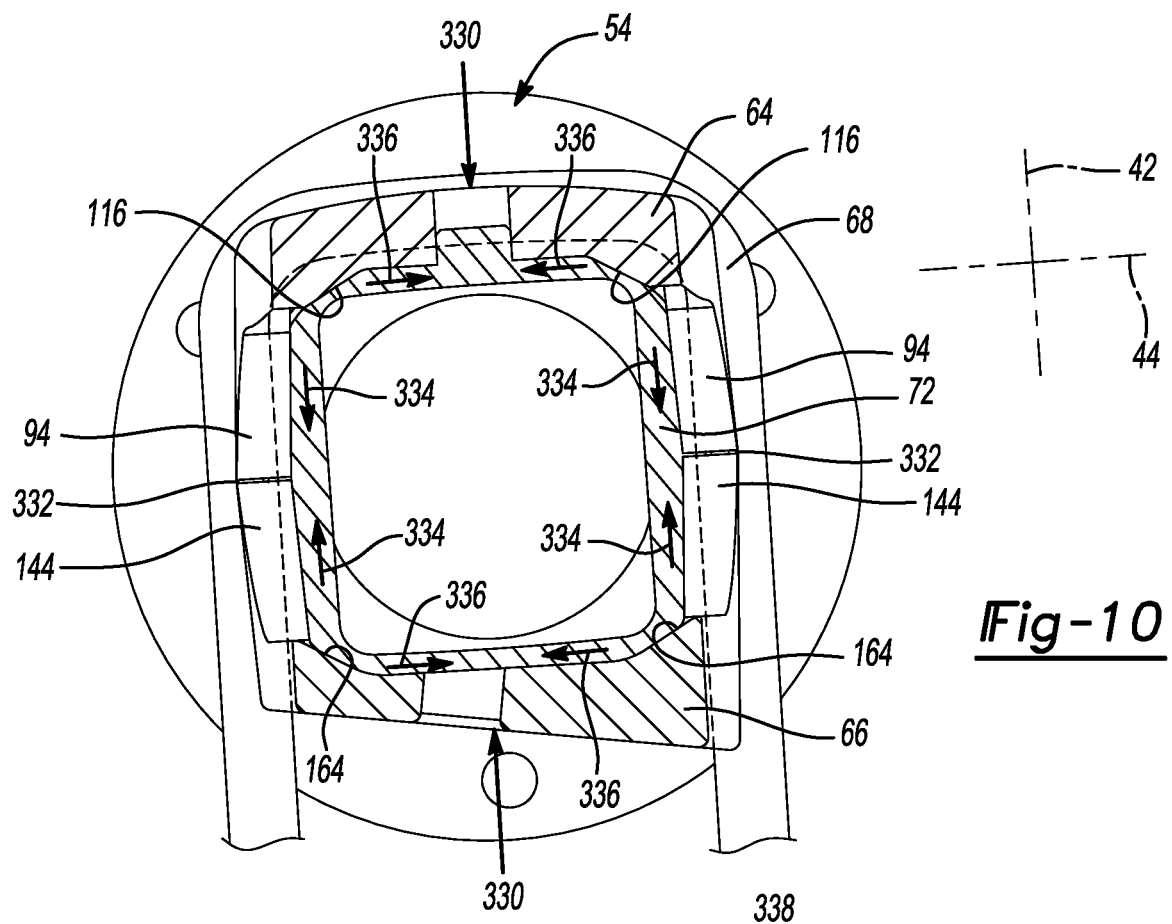
FIG. 10 is a sectional view of the upper and lower brackets of FIG. 2, taken at line 5-5 of FIG. 2.

With reference to FIG. 9, a method of assembling a suspension interconnection assembly in accordance with the subject disclosure is provided. The method is described in the context of the suspension interconnection assembly 40 of FIGS. 2-5. However, those skilled in the art will appreciate that the method may be performed with other suspension interconnection assemblies in accordance with the subject disclosure. The method generally includes: optionally adjusting a height of one or more of the arms 94, 96, 144, 146 at step 260; disposing the first saddle bracket 64 on the axle housing 52 at step 264; disposing the second saddle bracket 66 on the axle housing 52 at step 268; optionally decreasing a dimension of the pre-clamp gap at 272; interconnecting the spring 62, the first and second saddle brackets 64, 66, and the axle housing 52 to one another at step 276; placing the suspension interconnection assembly 40 in a first loaded configuration at step 280; placing the suspension interconnection assembly 40 in a second loaded configuration at 284; optionally allowing the suspension interconnection assembly to relax to a third loaded configuration at step 288; and optionally welding the second saddle bracket 66 to the axle housing 52 at 290.

At step 260, the method may optionally include adjusting a length of the pair of first arms 94, the pair of second arms 96, the pair of third arms 144, and/or the pair of fourth arms 146. Adjusting may include reducing a length of the pair of first arms 94, the pair of second arms 96, the pair of third arms 144, and/or the pair of fourth arms 146. Reducing may include machining the first, second, third, and/or fourth distal surfaces 106, 110, 158, 162. Step 260 may be performed when a pre-clamp gap between the first and second saddle brackets 64, 66 would be too small to generate requisite compressive stresses in the peripheral wall 72.

At 264, the method includes disposing the first saddle bracket 64 around a portion of the peripheral wall 72 of the axle housing 52 so that the peripheral wall 72 is at least partially received in the first U-shaped pocket 98. The first saddle bracket 64 may be located along the longitudinal axis 76 by disposing the pin 82 of the axle housing 52 at least partially within the receptacle 102 of the first saddle bracket 64.

Figures 11, 12:
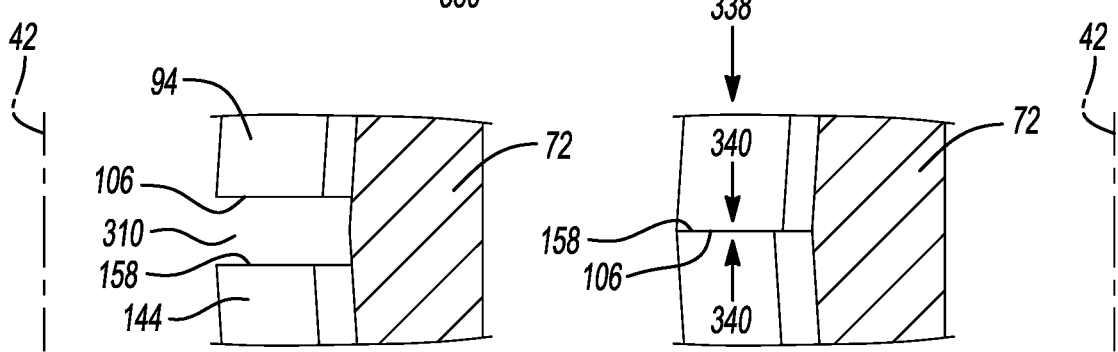
FIG. 11 is a partial side views of the suspension interconnection assembly of FIG. 9 in a first loaded configuration.
FIG. 12 is a partial side view of the suspension interconnection assembly of FIG. 9 in a second loaded configuration.

At 268, the method may include disposing the second saddle bracket 66 around another portion of the peripheral wall 72 of the axle housing 52 so that the peripheral wall 72 is at least partially received in the second U-shaped pocket 148. The second saddle bracket 66 may be located along the longitudinal axis 76 by aligning the pair of third arms 144 with the pair of first arms 94, and the pair of fourth arms 146 with the pair of second arms 96. As shown in FIG. 11, one of the first arms 94 is spaced apart from one of the third arms 144 along the first axis 42 to define a pre-clamp gap 310. A dimension of the pre-clamp gap 310 is determined based on desired compressive loads to be imparted to the peripheral wall 72, as described in greater detail below. Step 268 may be performed concurrently with step 264.

Figures 13, 14:
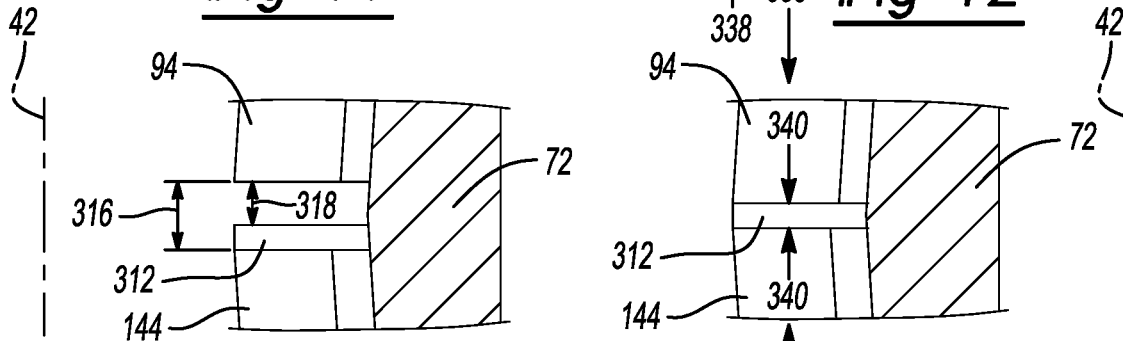
FIG. 13 is a partial side view of another suspension interconnection assembly in accordance with the subject disclosure, the suspension interconnection assembly being in a first loaded configuration.
FIG. 14 is a partial side view of the suspension interconnection assembly of FIG. 12 in a second loaded configuration.

At 272, the method may optionally include adjusting the dimension of the pre-clamp gap 310. Adjusting may include reducing the dimension of the pre-clamp cap 310. With reference to FIG. 13, reducing may including placing a shim 312 within the pre-clamp gap. The shim 312 may engage at least one of the first arm 94 and the third arm 144. Prior to placement of the shim 312 the pre-clamp gap 310 may have a first dimension 316. After placement of the shim 312, the pre-clamp gap 310 may have a second dimension 318 less than the first dimension 316.

Returning to FIG. 9, at 276, the method may further including coupling the axle housing 52, the first and second saddle brackets 64, 66, and the spring 62 to one another. Coupling may including interconnecting the fastener 68 with the first and second saddle brackets 64, 66 and the spring 62 to couple the first and second saddle brackets 64, 66 and the spring 62 to the axle housing 52. More particularly, coupling may include disposing the spring 62 between the second saddle bracket 66 and the plate 70. Coupling may further include disposing the U-shaped bodies 182 of the fasteners 68 around the first outer surface 118 of the first saddle bracket 64 and the second outer surface 166 of the second saddle bracket 66. Each of the U-shaped bodies 182 may be disposed at least partially within a respective one of the first channels 120 of the first saddle bracket 64 and pair of the second channels 168 of the second bracket 66. Coupling may further including engaging nuts 186 with respective threaded distal ends 184 of the fasteners 68 adjacent to the third outer surface 190 of the plate 70.

At 280, the suspension interconnection assembly 40 may be placed in a first loaded configuration. The fasteners 68 may be tightened (e.g., by rotating the nuts 186 on respective threaded distal ends 184) to apply a first load 330 along the first axis 42, as shown in FIG. 10. In the first loaded configuration, the pairs of first and third arms 94, 144 remain spaced apart to define a gap 332 between the first distal ends 106 and the third distal ends 158. The gap 332 has a dimension less than the pre-clamp gap 310. The first and second beveled surfaces 116, 164 operatively engage the peripheral wall 72. The operative engagement generates a first compressive stress 334 in the peripheral wall 72 along the first axis 42, and a second compressive stress 336 in the peripheral wall 72 along the second axis 44. Magnitudes of the first and second compressive stresses 334, 336 are limited by the dimension of the pre-clamp gap 310 (FIG. 11). When first and second saddle brackets include pairs of protrusions, such as the saddle bracket 210 of FIG. 8, step 280 further includes operatively engaging the protrusions with the peripheral wall to longitudinally distribute compressive stresses and reduce a maximum compressive stress.

At 284, the suspension interconnection assembly 40 may be placed in a second loaded configuration. The fasteners 68 may be further tightened to apply a second load 338 greater than a first load along the first axis 42, as shown in FIG. 12. The first arms 94 operatively engage the third arms 144. The first and third arms 94, 144 may be in direct engagement, as shown in FIG. 12, or indirect engagement as shown in FIG. 14, such as when the shim 312 is present. In direct engagement, the first distal surface 106 operatively engages the third distal surface 158. The operative engagement generates a third load 340 generating compressive stress in the first and third arms 94, 144 along the first axis 42, thereby limiting magnitudes of the first and second compressive stresses 334, 336. The limitation on first and second compressive stresses 334, 336 may minimize or prevent crushing of the peripheral wall 72 of the axle housing 52.

At 288, the method may further optionally include allowing the suspension interconnection assembly 40 to relax to a third configuration. The fasteners 68 are loosened to apply a third load greater than the first load 330 and less than the second load 338. The fasteners 68 may be loosened to the third configuration while transporting the suspension interconnection assembly 40, or during operation of the vehicle, for example. The first and third arms 94, 144 remain engaged.

The first and second beveled surfaces 116, 164 remain in operative engagement with the peripheral wall 72 to ensure that the peripheral wall 72 is sufficiently clamped between the first and second saddle brackets 64, 66.

At 290, the method may optionally including welding the saddle assembly to the peripheral wall 72. The saddle assembly may be welded to the peripheral wall 72 to prevent rotation of the saddle assembly with respect to the peripheral wall 72 about the longitudinal axis 76, such as when a peripheral wall has a substantially circular cross section. Welding includes disposing a weld bead on a portion of the peripheral wall adapted to be in compression during a static loading condition, as described in conjunction with FIG. 1. In some embodiments, a weld bead couples a second or bottom saddle bracket to a peripheral wall of a substantially round axle housing between fasteners 68.

A suspension interconnection assembly in accordance with the subject disclosure is therefore adapted to distribute compressive stresses in a peripheral wall of an axle housing along first and second perpendicular axes via operative engagement of beveled surfaces on a saddle bracket assembly with the peripheral wall. The suspension interconnection assembly is further adapted to be over-clamped to account for further loosening of the fasteners 68 without crushing the peripheral wall due to operative engagement of the first and second saddle brackets with one another. In some embodiments, the suspension interconnection assembly is also adapted to distribute portions of the compressive stresses in the peripheral wall along a longitudinal axis via operative engagement of protrusions on the beveled surface with the peripheral wall. The distribution of stress along the longitudinal axis reduces a maximum stress in the axle housing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A suspension interconnection assembly for a vehicle including a spring and an axle housing having a peripheral wall, the suspension interconnection assembly comprising:
    a first saddle bracket comprising a first base, a pair of first arms being spaced apart and having the first base disposed therebetween, and a pair of first shoulders, each first shoulder being disposed between the first base and a respective first arm and having a first beveled surface, the pair of first shoulders cooperating with the first base and the pair of first arms to at least partially define a first U-shaped pocket;
    a second saddle bracket comprising a second base, a pair of second arms being spaced apart and having the second base disposed therebetween, and a pair of second shoulders, each second shoulder being disposed between the second base and a respective second arm and having a second beveled surface, the pair of second shoulders cooperating with the second base and the pair of second arms to at least partially define a second U-shaped pocket, the first U-shaped pocket and the second U-shaped pocket being sized to partially receive the axle housing; and
    a fastener interconnecting the first saddle bracket and the second saddle bracket to couple the first saddle bracket, the second saddle bracket, and the spring to the axle housing, the first beveled surfaces being adapted to operatively engage the peripheral wall and the second beveled surfaces being adapted to operatively engage the peripheral wall, wherein the pair of first arms is adapted to directly engage the pair of second arms after the first beveled surfaces and second beveled surfaces operatively engage the peripheral wall.

2. The suspension interconnection assembly of claim 1, wherein:
    in a first loaded configuration, the pair of first arms is spaced apart from the pair of second arms to define a gap between distal ends of the first arms and the second arms along a first axis substantially perpendicular to the longitudinal axis and the first beveled surface and the second beveled surface operatively engage the peripheral wall to generate a first compressive stress in the peripheral wall along the first axis and a second compressive stress in the peripheral wall along a second axis substantially perpendicular to the first axis and the longitudinal axis; and
    in a second loaded configuration, the pair of first arms operatively engages the pair of second arms to generate a third compressive stress in the pair of first arms and the pair of second arms along the first axis.

3. The suspension interconnection assembly of claim 1, wherein:
    the fastener engages the first saddle bracket and the second saddle bracket at a first longitudinal region of the suspension interconnection assembly;
    the first saddle bracket further includes a pair of first protrusions disposed at a second longitudinal region of the suspension interconnection assembly, each first protrusion extending from a respective first beveled surface and being adapted to operatively engage the peripheral wall; and
    the second saddle bracket further includes a pair of second protrusions disposed at the second longitudinal region, each second protrusion extending from a respective second beveled surface and being adapted to operatively engage the peripheral wall.

4. The suspension interconnection assembly of claim 3, wherein:
    the fastener comprises a first fastener and a second fastener; and
    the first longitudinal region comprises a pair of first longitudinal regions and the second longitudinal region is disposed therebetween.

5. The suspension interconnection assembly of claim 1, further comprising:
    a plate operable to capture the spring between the second saddle bracket and the plate, the fastener engaging the plate to couple the plate and the spring to the axle housing.

6. The suspension interconnection assembly of claim 1, wherein the fastener comprises a U-bolt, the U-bolt extending around at least a portion of a first outer surface of the first saddle bracket and at least a portion of a second outer surface of the second saddle bracket.

7. The suspension interconnection assembly of claim 6, wherein the first outer surface includes a first channel, the second outer surface includes a second channel, and the U-bolt is at least partially received in the first channel and the second channel.

8. The suspension interconnection assembly of claim 1, wherein:
the first saddle bracket further comprises a pair of third arms, the pair of third arms being longitudinally spaced apart from the pair of first arms; and
the second saddle bracket further comprises a fourth pair of arms, the fourth pair of arms being longitudinally spaced apart from the second pair of arms.

9. The suspension interconnection assembly of claim 1, wherein the axle housing has a substantially rectangular cross section in a direction substantially perpendicular to the longitudinal axis.

10. The suspension interconnection assembly of claim 1, wherein the first base includes a receptacle and the axle housing includes a pin extending from an outer surface of the axle housing and received by the receptacle.

11. A method of assembling a suspension interconnection assembly for a vehicle, the method comprising:
disposing a first saddle bracket around a first portion of a peripheral wall of an axle housing having a longitudinal axis, the first saddle bracket comprising a first base, a pair of first arms being spaced apart and having the first base disposed therebetween, and a pair of first shoulders, each first shoulder being disposed between the first base and a respective first arm and having a first beveled surface, the pair of first shoulders cooperating with the first base and the pair of first arms to at least partially define a first U-shaped pocket into which the axle housing is at least partially received;
disposing a second saddle bracket around a second portion of the peripheral wall, the second saddle bracket comprising a second base, a pair of second arms being spaced apart and having the second base disposed therebetween, and a pair of second shoulders, each second shoulder being disposed between the second base and a respective second arm and having a second beveled surface, the pair of second shoulders cooperating with the second base and the pair of second arms to at least partially define a second U-shaped pocket into which the axle housing is at least partially received, the pair of first arms being spaced apart from the pair of second arms to define a gap along a first axis substantially parallel to the longitudinal axis;
operatively engaging the first beveled surfaces and the second beveled surfaces with the peripheral wall to generate a first compressive stress in the peripheral wall along the first axis and a second compressive stress in the peripheral wall along a second axis substantially perpendicular to the first axis and the longitudinal axis; and
directly engaging the pair of first arms with the pair of second arms to generate a third compressive stress in the pair of first arms and the pair of second arms along the first axis to limit a magnitude of the first compressive stress.

12. The method of claim 11, further comprising coupling the first saddle bracket and the second saddle bracket to the axle housing by engaging a fastener with the first saddle bracket and the second saddle bracket.

13. The method of claim 12, wherein:
operatively engaging the first beveled surfaces and the second beveled surfaces with the peripheral wall comprises applying a first load to the first saddle bracket and the second saddle bracket parallel to the first axis; and
operatively engaging the pair of first arms with the pair of second arms comprises applying a second load to the first saddle bracket and the second saddle bracket parallel to the first axis.

14. The method of claim 13, wherein:
applying the first load comprises tightening the fastener; and
applying the second load comprises tightening the fastener.

15. The method of claim 14, wherein the fastener is configured to loosen such that a third load is applied to the first saddle bracket and the second saddle bracket along the first axis, the third load being greater than or equal to the first load and less than or equal to the second load.

16. The method of claim 12, further comprising, prior to coupling, disposing a spring between the second saddle bracket and a plate, wherein the coupling further includes engaging the fastener with the plate.

17. The method of claim 12, wherein the fastener comprises a U-bolt and the coupling includes disposing the U-bolt at least partially in a first channel of a first outer surface of the first saddle bracket and a second channel of a second outer surface of the second saddle bracket.

18. The method of claim 12, wherein engaging the fastener comprises engaging the fastener with the first saddle bracket and the second saddle bracket in a first longitudinal region of the suspension interconnection assembly.

19. The method of claim 18, further comprising operatively engaging a pair of first protrusions and a pair of second protrusions with the peripheral wall in a second longitudinal region of the suspension interconnection assembly, the pair of first protrusions extending from respective first beveled surfaces, and the pair of second protrusions extending from respective second beveled surfaces.

20. The method of claim 11, further comprising adjusting a dimension of the gap prior to operatively engaging the first beveled surfaces and the second beveled surfaces with the peripheral wall, wherein the adjusting includes at least one of (i) reducing a dimension of the gap by disposing a pair of shims between the first pair of arms and the second pair of arms and (ii) increasing a dimension of the gap by machining at least one surface of the pair of first arms and the pair of second arms.

* * * * *